United States Patent [19]

Hale et al.

[11] 3,759,355

[45] Sept. 18, 1973

[54] MOTION RETARDING SYSTEM FOR TRUCKS

[76] Inventors: John D. Hale; Frank L. Hale, both of P.O. Box 11, Swisshome; Samuel J. Hale, Jr., Star Rt. Box 33, Chesire, all of Oreg.

[22] Filed: Feb. 7, 1972

[21] Appl. No.: 223,891

[52] U.S. Cl. ............................. 188/290, 188/2 R
[51] Int. Cl. .......................................... F16d 57/00
[58] Field of Search .................. 188/2 R, 272, 290, 188/293, 296; 303/10

[56] References Cited
UNITED STATES PATENTS

| | | | |
|---|---|---|---|
| 2,905,276 | 9/1959 | Henderson et al. | 188/290 |
| 2,956,647 | 10/1960 | Bartholomäus | 188/290 UX |
| 3,185,261 | 5/1965 | Campbell et al. | 188/296 |
| 3,362,510 | 1/1968 | Nash | 188/290 |
| 3,593,828 | 7/1971 | Klein | 188/290 X |

FOREIGN PATENTS OR APPLICATIONS 545,348  6/1956  Italy ................................ 188/290

Primary Examiner—Duane A. Reger
Attorney—James D. Givnan, Jr.

[57] ABSTRACT

A supplementary braking system for trucks for operation in direct coupled engagement with the vehicles drive shaft. A base, in attachment with a differential of the truck, mounts a hydraulic pump coupled in an axial manner with a truck drive shaft component. The discharge flow from said pump enters a valve housing wherein valve components may selectively regulate fluid flow to load or unload the pump. A reservoir is located adjacent an axle assembly of the truck and receives an airstream flow for cooling purposes.

2 Claims, 6 Drawing Figures

Patented Sept. 18, 1973
3,759,355
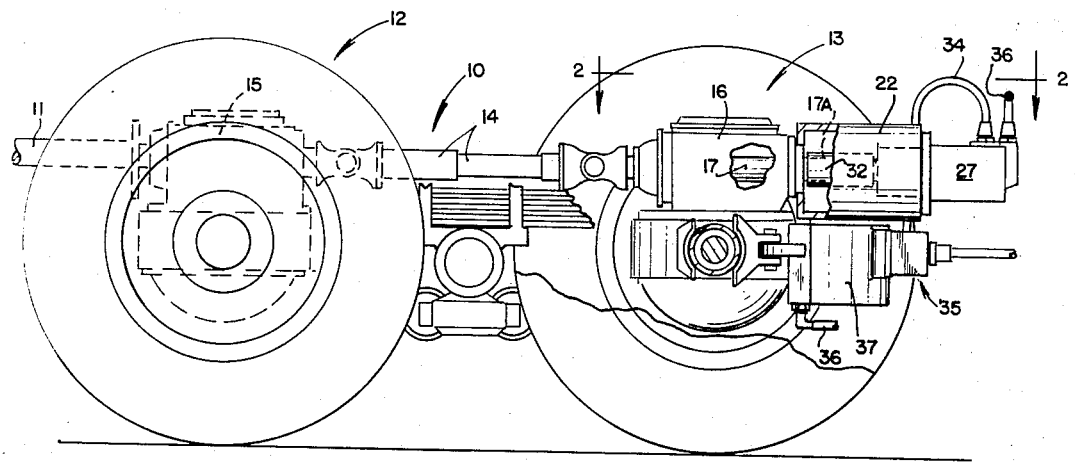
Fig.1
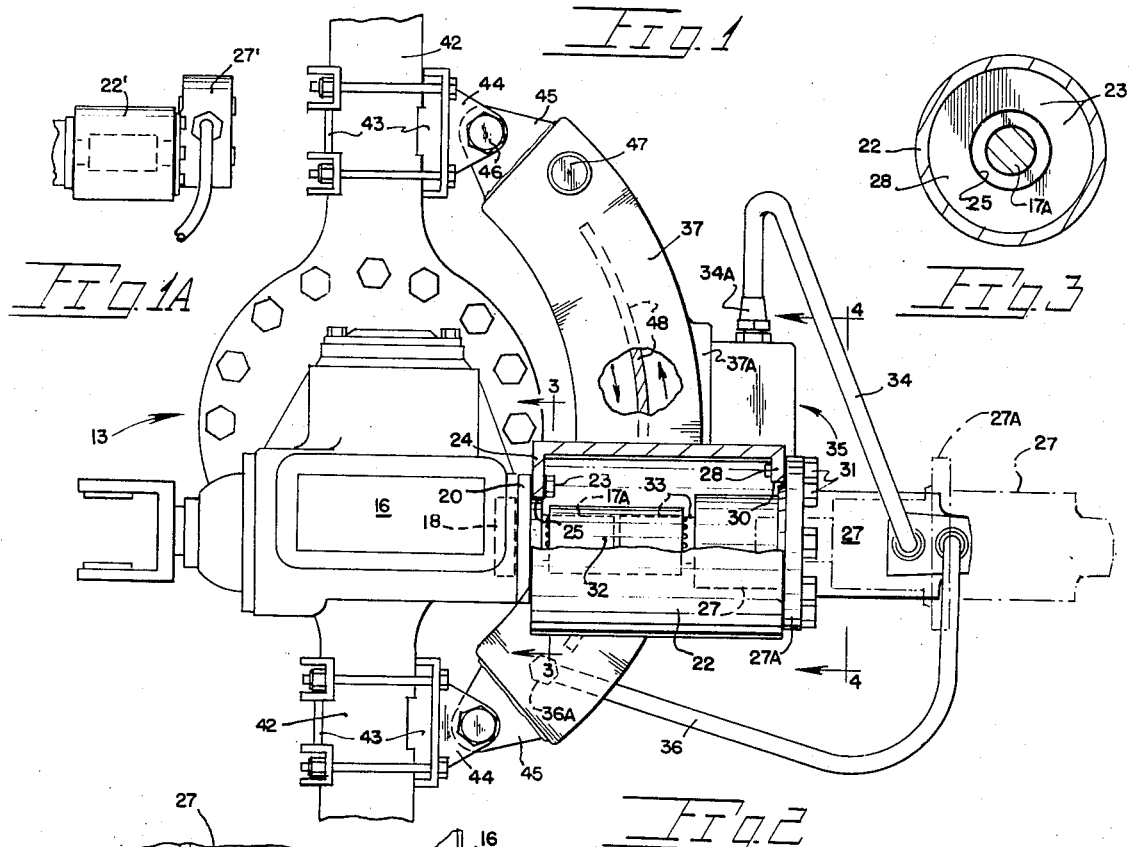
Fig.1A
Fig.2
Fig.3
Fig.4
Fig.5

MOTION RETARDING SYSTEM FOR TRUCKS

BACKGROUND OF THE INVENTION

The present invention concerns a system for use in combination with conventional truck power train components and particularly to a system for absorbing torque from a truck drive shaft during braking of the vehicle by truck brakes.

With the size and payload of heavy duty trucks increasing the problem of providing low maintenance, adequate braking systems is receiving constant attention. Brake maintenance is a significant cost factor in turck operations where severe brake use is encountered in its day-to-day operation. Log truck operations, for example, typically include extended periods of downhill braking with resultant rapid wear of brake components. Such severe, extened application of conventional braking systems additionally results in a reduction of brake efficiency with gradual loss of efficiency being termed "brake fade." In extreme cases brake fade can result in the loss of substantially all braking action.

To alleviate rapid brake wear large, heavy duty trucks are often equipped with an auxiliary vehicle braking system in the form of an engine exhaust restricting system. Such systems are termed "engine brakes" in that the decelerated engine expends reaction energy imparted to it by the drive line by reason of the engine, in effect, pumping exhaust gases past a temporary exhaust restriction. Such systems while of assistance to the conventional brake system of a vehicle, do not lend themselves to all truck installations. For example, the use of "exhaust" or "engine" brakes are prohibited in some areas for noise abatement reasons. Further, the increasing severity of governmental restrictions pertaining to reducing vehicle exhaust emissions complicates the wide use of exhaust type brakes.

Additional efforts to provide supplementary type brake systems have included the application of hydraulic pump means for absorbing drive shaft torque by pumping fluid flow past a flow restriction. One such effort is disclosed in the U. S. Pat. No. 3,315,770 to B. T. Wall wherein pump means are embodied within a wheel assembly. Another arrangement is shown in the U. S. Pat. No. 2,413,162 to H. M. Ackerman, wherein a fluid pump is driven by a transmission component of the vehicle with fluid being directed past adjustable valve members. These and other efforts within the prior art have not been received with wide acceptance for one or another reason. One possible reason for the lack of acceptance by the trucking industry would perhaps be their complexity plus the radical and costly modification required of existing drive line components.

SUMMARY OF THE INVENTION

The present invention is embodied within a compact, accessory type unit attachable in a self-contained, unitary manner to an axle of a truck bogie the latter usually comprising a pair of tandem axles. More specifically, the present system is addapted for coupling to a differential housing of the bogie. Existing truck drive lines include axle structure wherein the forward differential is adapted to transmit or relay torque on to a second or rearward differential via an interconnecting short drive shaft. This interconnecting shaft, transmitting torque to the second differential, normally dead ends within the second differential housing. In the instant system a stock drive shaft component extends through the second differential with its rearward end receiving a coupling member of the present system. Additional system components are secured to the differential and axle housings.

The present system in no way jeopardizes the integrity of conventional drive components but rather operates independently of said components other than relying on same for torque input. Deactivation of the present system is readily accomplished and once uncoupled the truck drive power train operates in its original manner.

Energy from the truck drive line, during deceleration, is absorbed by a fluid pump working against a restricted discharge. Alternately, the continuously driven pump exhausts fluid in an unrestricted manner to a reservoir with little or no effect on the power delivered to the driving wheels.

An important feature of the present invention is to provide means for dissipating truck inertia during braking by a system entirely separate from the vehicles brake system. The subject system imparts a braking reaction force directly to a drive shaft component of the truck drive line which in turn inhibits wheel rotation. Reaction torque imparted to the truck differential or differentials by the truck wheels is partially absorbed in the driving of a hydraulic pump of the present system.

Another important object is the provision of a vehicle retarding system utilizing hydraulic components of proven, high reliability in removable coupled engagement with a truck differential. Detachment of the present system, for whatever reason, may be conveniently accomplished within a short period leaving the truck fully operable during servicing or replacement of the present systems components. Along a similar line, the novel mounting arrangement disclosed enables the incorporation of the present system into the most common makes of truck bogies at a reasonable cost to the truck owner.

A further object of the present invention is the provision of a compact system supported adjacent an axle of a truck bogie and including a reservoir located to take advantage of the airstream for cooling purposes. Further the tank structure includes means for circulating a hydraulic flow along the tank walls for best cooling by the airstream.

BRIEF DESCRIPTION OF THE DRAWING

In the accompanying drawing:

FIG. 1 is a side elevational view of a typical truck bogie with a rearward wheel assembly and suspension components broken away for purposes of illustration, FIG. 1A is a side elevational view showing a modified form of the invention for reception of other pump means, FIG. 2 is a plan view taken approximately along line 2—2 of FIG. 1 showing the present system in combination with a truck differential and axle structure, FIG. 3 is a vertical section taken along line 3—3 of FIG. 2 showing details of the present systems mounting assembly, FIG. 4 is an elevational view taken along line 4—4 of FIG. 2 showing details of the present systems tank and hydraulic components associated therewith, and FIG. 5 is a flow schematic of one form of the present systems hydraulic circuit.

DESCRIPTION OF THE PREFERRED EMBODIMENTS

With continuing reference to the accompanying drawing wherein applied reference numerals indicate parts similarly identified in the following specification, the reference numeral 10 indicates generally a truck bogie the latter being a term applied to the driving wheel assemly of a truck and normally comprising at least two wheel-axle assemblies. While shown in use with a truck bogie the present system is equally applicable to a single wheel-axle assembly.

A drive shaft 11 transmits engine power to a first axle and wheel assembly indicated generally at 12 while a second axle and wheel assembly generally at 13 is powered by a continuation of the truck drive shaft termed an inter-axle drive shaft at 14. Drive trains for heavy duty trucks include differentials as an integral part of each axle and wheel assembly with typical front and rear differentials being indicated at 15-16. The differential 15 associated with the forward axlewheel assembly is substantially identical to that indicated at 16 with differences later noted. With continuing attention to the conventional bogie structure disclosed, the front and rear wheel assemblies are interconnected in the usual manner by various suspension components, springs, torque rods, etc., all being conventional with the details of which not important to an understanding of the instant invention.

The inter-axle drive shaft 14 serves to relay drive shaft torque from the main drive shaft 11 and differential 15 on to the trailing or second differential at 16. For purposes of transmitting such torque, the differential of the first wheelaxle assembly includes a drive line component journalled within the differential housing and terminates rearwardly of said housing for universal attachment to the forward of inter-axle drive shaft 14. Normally the trailing differential will not include shaft means for relaying torque therepast as discussed below.

In the present system, the second differential housing at 16 is equipped with drive shaft extension 17 extending through the differential and terminating rearwardly at 17A. The shaft 17, added to differential 16, may be identical to the shaft earlier described for relaying torque past differential 15. Installation of shaft 17 is accomplished with but slight change to the differential housing 16, the change being the addition of a bearing 18 (FIG. 2) and oil seal 20 at the rearward end of the differential. The differential housings for both the differentials 15 and 16 are usually identical castings hence, in some cases, merely the removal of a closure plate is required followed by installation of the oil seal and bearing. Similarly, stock shaft means, as earlier noted, may be installed within the modified second differential 16.

A base for the present system is indicated at 22 in bolted securement at 23 to the rearward face of differential 16. Base 22 is of open construction having a forwardly disposed flange 24 defining an opening 25 circumposed about a portion of the differential. Bolts 23 terminate in threaded engagement within threaded sockets existing in the differential. In many cases the existing sockets may prove adequate while in others the same may require drilling and tapping to provide for adequate bolted securement of the base 22.

For reception of hydraulic pump means at 27, the base additionally includes a flange 28 which is of annular configuration as seen in the fragmentary view of FIG. 4. The opening at 30, defined by flange 28, is in close registration about a shoulder on the housing of pump 27 to receive bolts 31 passing through a mounting flange 27A of the pump and into threaded engagement with flange 28. It is apparent that the dimensions of the base 22 may be varied to best suit the make and model of differential to which it is mounted while similarly, the rearward portion of base 22 may be altered from that shown to best accommodate the pump make and model mounted thereon. FIG. 1A shows another positive displacement type pump 27' which is of the gear type. Since internal relief means are undesirable the same may be deactivated in any pump selected.

Interiorly of base 22 a coupling 32, in the form of a splined sleeve, interconnects the aligned end 17A of drive line component 17 and an input shaft 33 of pump 27. The coupling is internally splined to permit axial engagement and separation of the shaft ends by movement along their common axes. The arrangement shown permits convenient deactivation of the system, as for periodic servicing, by readily allowing temporary removal of pump 27 with uncoupling of its shaft 33. Coupling 32 may also be removed. The uncoupled end 17A of drive shaft component 17 may then freely rotate within the base during system deactivation. Pump removal will require temporary capping of hydraulic reservoir ports later described.

Fluid discharged by pump 27 is circuited via line 34, fitting 34A through a valve housing indicated generally at 35. Serving the pump is a conduit 36 providing a source of fluid flow to the pump from a hydraulic reservoir 37. The pump, conduits, valve means and tank all constitute a fluid circuit through which hydraulic fluid circulates during operation of the pump 27.

With attention to FIGS. 2, 4 and 5 it will be seen that valve housing 35 includes an electrically actuated unloading valve 38 operable by a solenoid 39 in circuit with a driver operated switch not shown. Valve housing 35 additionally houses a variable relief valve 40 and a pilot operated relief valve 41 all in discharge communication with the reservoir 37. Hydraulic fluid delivered to valve housing 35 via conduit 34 will flow directly to reservoir 37 upon unloading valve 38 being positioned as shown in FIG. 5. Closing of valve 38 directs fluid flow past variable relief valve 40 to load the pump. The pilot operated relief valve 41 serves to protect the system components from excessive hydraulic pressure. While not shown as being electrically controlled, the variable relief valve 40 may be remotely controlled via an electrical circuit independent of that circuit controlling the solenoid 39 of unloading valve 38.

With regard to the hydraulic reservoir 37 the same is shown in supported attachment at its ends with the truck axle housing 42. Brackets at 43 are segmented for clamped securement about a portion of the truck axle housing with each of said brackets including a clevis 44 formed thereon to receive a mounting flange 45 in welded attachment to the reservoir ends. Bolt members 46 complete the attachment of the reservoir to the clevises 44. The reservoir includes a mounting surface 37A to receive valve housing 35 with the reservoir ported to receive a flow from the valve housing. A tank outlet port at 49 receives a conduit fitting 36A.

With reference to FIG. 1 it will be seen that reservoir 37 is located aft of the differential and axle housings to partake of a cooling airstream flow during vehicle movement. The substantial surface area of the tank provides a heat radiating surface adequate to cool the fluid passing therethrough. The tank is provided with a filler opening which is closed and vented by a cap 47. Further, baffle means 48 may be provided within reservoir 37 for the purpose of directing the flow therewithin to best achieve both cooling and desired oil flow.

In operation, the present system is periodically actuated by the truck operator during periods where prolonged braking is required to hold truck speed to within a required speed limit. Energy from the drive shaft, originating from wheel rotation, is dissipated to a degree in the driving of pump 27. Additional dissipation may be by other retarding systems, such as the exhaust restricting systems both systems singly or jointly supplementing conventional brake system operation.

The loading of the pump is achieved by restricting fluid flow past the variable relief valve 40 which may be pre-set or of the type being remotely setable. Oil cooling is achieved by the system components being exposed to the airstream. If desired, well known expedients such as heat radiating fins may be provided on the tank for heat radiation purposes.

The system components will vary as to the truck installation with such variation all coming within the scope of the present invention.

While we have shown various embodiments of the invention it will be apparent to those skilled in the art that the invention may be embodied still otherwise without departing from the spirit and scope of the invention.

Having thus described the invention what is desired to be secured under a Letters Patent is:

1. In combination with a vehicle differential unit and its associated axle housing, the differential unit including a drive shaft extension terminating rearwardly adjacent the differential unit, the improvement comprising, a base affixed at one of its ends to said differential unit and projecting horizontally rearward therefrom, hydraulic pump means in bolted engagement with the opposite end of said base and including an input shaft terminating within said base in axial alignment with the drive shaft extension, means coupling said input shaft with said extension permitting uncoupling of said pump means in an axial direction for servicing purposes, a fluid reservoir of elongate configuration in fluid circuit with said pump means, means mounting said reservoir to the axle housing, said reservoir transversely disposed to the airstream for impingement of the latter on at least one wall of the tank for fluid cooling purposes, and valve means in said fluid circuit and controlled by the vehicle driver for restricting the discharge flow of the pump to load same and thereby inhibit drive shaft rotation for vehicle braking.

2. The invention claimed in claim 1 wherein said reservoir includes a longitudinally disposed baffle to direct fluid flow generally parallel to the airstream cooled reservoir wall.

* * * * *